US00RE37363B1

(19) United States
(12) Reissued Patent
Gatto et al.

(10) Patent Number: US RE37,363 E
(45) Date of Reissued Patent: Sep. 11, 2001

(54) LUBRICANT CONTAINING MOLYBDENUM COMPOUND AND SECONDARY DIARYLAMINE

(75) Inventors: Vincent James Gatto, Midlothian; Mark Thomas Devlin, Richmond, both of VA (US)

(73) Assignee: Ethyl Corporation, Richmond, VA (US)

(21) Appl. No.: 09/359,770

(22) Filed: Jul. 22, 1999

Related U.S. Patent Documents

Reissue of:
(64) Patent No.: 5,650,381
Issued: Jul. 22, 1997
Appl. No.: 08/559,879
Filed: Nov. 20, 1995

(51) Int. Cl.[7] ..... C10M 141/02; C10M 141/06; C10M 141/12

(52) U.S. Cl. ..... 508/364; 508/527

(58) Field of Search ..... 508/364, 527

(56) References Cited

U.S. PATENT DOCUMENTS

| | | | | |
|---|---|---|---|---|
| 3,285,942 | | 11/1966 | Price et al. | 260/429 |
| 4,095,963 | | 6/1978 | Lineberry | 55/54 |
| 4,175,043 | | 11/1979 | Horodysky | 252/32.7 |
| 4,394,279 | | 7/1983 | De Vries et al. | 252/46.4 |
| 4,428,848 | | 1/1984 | Levine et al. | 252/32.7 |
| 4,479,883 | * | 10/1984 | Shaub et al. | 252/33.6 |
| 4,593,012 | | 6/1986 | Usui et al. | 502/167 |
| 4,648,985 | * | 3/1987 | Thorsell et al. | 252/35 |
| 4,812,246 | | 3/1989 | Yabe | 252/32.7 |
| 4,832,857 | | 5/1989 | Hunt et al. | 252/33 |
| 4,846,983 | | 7/1989 | Ward | 252/33.6 |
| 4,889,647 | | 12/1989 | Rowan et al. | 252/42.7 |
| 5,137,647 | | 8/1992 | Karol | 252/33.6 |
| 5,143,633 | | 9/1992 | Gallo et al. | 252/18 |
| 5,232,614 | * | 8/1993 | Colclough et al. | 252/50 |

FOREIGN PATENT DOCUMENTS

| | | |
|---|---|---|
| 0696636 A1 | 2/1996 | (EP) . |
| 2097422 A | 11/1982 | (GB) . |
| 9507962 | 3/1995 | (WO) . |
| 9507963 | 3/1995 | (WO) . |
| 9507966 | 3/1995 | (WO) . |
| WO 95/07962 | 3/1995 | (WO) . |
| WO 95/07963 | 3/1995 | (WO) . |
| WO 95/07966 | 3/1995 | (WO) . |
| WO 95/27022 | 10/1995 | (WO) . |

OTHER PUBLICATIONS

Vanderbilt Lubricant Additives Technical Bulletin 941, R.T. Vanderbilt Company, Inc., (Jun. 1994).

MOLYVAN®822 Oil Soluble Molybdenum–Sulfur Lubricant Additive Non–Phosphorus Friction Reducer Antioxidant, Technical Data, MV–822–1A/8604 (8203), R.T. Vanderbilt Company, Inc., (Apr. 1986).

"Vanderbilt Lubricant Additives", R.T. Vanderbilt Company, Inc. (date?) Not provided.

* cited by examiner

*Primary Examiner*—Margaret Medley
(74) *Attorney, Agent, or Firm*—Pillsbury Madison & Sutro LLP

(57) ABSTRACT

There is disclosed a lubricating oil composition which contains from about 100 to 450 parts per million of molybdenum from a molybdenum compound which is substantially free of active sulfur and about 750 to 5,000 parts per million of a secondary diarylamine. This combination of ingredients provides improved oxidation control and friction modifier performance to the lubricating oil. The composition is particularly suited for use as a crankcase lubricant.

22 Claims, No Drawings

LUBRICANT CONTAINING MOLYBDENUM COMPOUND AND SECONDARY DIARYLAMINE

Matter enclosed in heavy brackets [ ] appears in the original patent but forms no part of this reissue specification; matter printed in italics indicates the additions made by reissue.

*Application Ser. No. 09/359,770, filed Jul. 22, 1990, and copending application Ser. No. 09/604,285, filed Jun. 26, 2000 are each reissues of U.S. Pat. No. 5,650,381 (application Ser. No. 08/559,879), filed Nov. 20, 1995.*

BACKGROUND OF THE INVENTION

1. Field of the Invention

This invention relates to lubricating oil compositions, their method of preparation, and use. More specifically this invention relates to lubricating oil compositions which contain a molybdenum compound and a secondary diarylamine wherein the molybdenum compound is substantially free of active sulfur. The use of both the molybdenum and amine within certain concentrations provide improved oxidation control and friction modifier performance to lubricating oil compositions. The lubricating oil compositions of this invention are particularly useful as crankcase lubricants.

2. Description of the Related Art

Lubricating oils as used in the internal combustion engines of automobiles or trucks are subjected to a demanding environment during use. This environment results in the oil suffering oxidation which is catalyzed by the presence of impurities in the oil such as iron compounds and is also promoted by the elevated temperatures of the oil during use. This oxidation of lubrication oils during use is usually controlled to some extent by the use of antioxidant additives which may extend the useful life of the oil, particularly by reducing or preventing unacceptable viscosity increases.

We have now discovered that a combination of about 100 to 450 parts per million (ppm) of molybdenum from an oil soluble molybdenum compound which is substantially free of active sulfur and about 750 to 5,000 ppm of an oil soluble secondary diarylamine is highly effective in inhibiting oxidation in lubricant compositions and that this antioxidant performance is supplemented by improved friction modifier performance. The molybdenum acts synergistically with secondary diarylamines to provide significant improvement in oxidation control. In addition to excellent oxidation control, the molybdenum compounds also act as friction modifiers to provide substantial fuel economy performance.

Lubricant compositions containing various molybdenum compounds and aromatic amines have been used in lubricating oils. Such compositions include active sulfur or phosphorus as part of the molybdenum compound, use additional metallic additives, various amine additives which are different from those used in this invention, and/or have concentrations of molybdenum and amine which do not show the synergistic results obtained by this invention.

U.S. Pat. No. 3,285,942 of Nov. 15, 1966 to Esso discloses the preparation of glycol molybdate complexes which have utility in lubrication oils.

U.S. Pat. No. 4,394,279 of Jul. 19, 1983 to L. de Vries et al. discloses an antioxidant additive combination for lubrication oils prepared by combining (a) an active sulfur containing molybdenum compound prepared by reacting an acidic molybdenum compound, a basic nitrogen compound and carbon disulfide with (b) an aromatic amine compound.

U.S. Pat. No. 4,832,857 of May 23, 1989 to Amoco Corp discloses a process for preparation of overbased molybdenum alkaline earth metal and alkali metal dispersions for use in lubricating oil compositions.

U.S. Pat. No. 4,846,983 of Jul. 11, 1989 W. C. Ward discloses molybdenum containing hydrocarbyl dithiocarbamates prepared from primary amines that impart antiwear, antioxidant, extreme pressure, and friction properties to lubricating oils. Again, among other shortcomings, these molybdenum compounds contain substantial quantities of active sulfur.

U.S. Pat. No. 4,889,647 of Dec. 26, 1989 to R. T. Vanderbilt Co. discloses organic molybdenum complexes for use in lubrication oil compositions.

U.S. Pat. No. 5,137,647 of Aug. 11, 1992 to R. T. Venderbilt Co. discloses molybdenum complexes for use in fuels and lubricating oil compositions.

U.S. Pat. No. 5,143,633 of Sept. 1, 1992 to Gallo et al discloses superbasic additives for lubricant oils containing an organic molybdenum complex.

WO95/07962 of Mar. 23, 1995 to A. Richie et al. discloses a crankcase lubricant composition for use in automobile or truck engines which contains copper, molybdenum, and aromatic amines. In addition to the requirement for use of copper, this publication recites a very broad range of concentrations for the molybdenum and the amine whereas the concentrations of amine used with the molybdenum in the examples of that publication is well outside the range which this invention has found to be synergistic. Also, many of the molybdenum compounds of this reference contain active sulphur, phosphorus, and other elements and the amines include compounds such as primary amines which were not found synergistic with the molybdenum carboxylates of this invention.

WO95/07963 of 23 Mar. 1995 to H. Shaub discloses highly sulfurized molybdenum compounds and various secondary aromatic amines having at least one aromatic group for producing a synergistic antioxidant effect when used as an antioxidant additive for lubricating oils. Again the molybdenum compounds contain active sulfur.

WO95/07966 of 23 Mar. 1995 to J. Atherton et al. discloses engine oil lubricants of various molybdenum compounds including that of some with active sulfur, certain organo-phosphorus compounds, an aminic antioxidant and a phenolic antioxidant within certain proportions.

SUMMARY OF THE INVENTION

In one aspect, this invention is directed to a lubricating composition comprising (a) a major amount of lubrication oil, (b) an oil soluble molybdenum compound substantially free of active sulfur which provides about 100 to 450 parts per million of molybdenum, and (c) about 750 to 5,000 parts per million (ppm) of an oil soluble secondary diarylamine.

In another aspect, the invention is directed to a method for improving the antioxidant and friction properties of a lubricant by incorporating in the lubricant a molybdenum compound which is substantially free of active sulfur and a secondary diarylamine in the above described concentrations.

In still another aspect, the invention is directed to a lubrication oil concentrate comprising a solvent and a combination of from about 2.5 to 90 percent by weight of an oil soluble molybdenum compound which is substantially free of active sulfur and an oil soluble secondary diarylamine wherein the weight ratio of molybdenum from the molybdenum compound to the diarylamine in the concentrate is from about 0.020 to 0.60 parts of molybdenum for each part of amine.

In yet another aspect the invention is directed to a lubricating composition prepared by mixing 100 to 450 parts per million of oil soluble molybdenum compound substantially free of active sulfur and 750 to 5,000 parts of a secondary diaryl amine in a lubricating composition.

In yet further aspect, the invention is directed to a lubrication oil concentrate prepared by dissolving in about 10 to 97.5 parts of a solvent a total of 2.5 to 90 parts of an oil soluble molybdenum compound substantially free of active sulfur and an oil soluble secondary diaryl amine.

In yet a still further aspect, the molybdenum compound used in the various compositions and methods of this invention is substantially free of sulfur.

The compositions of this invention have various uses as lubricants such as for automotive and truck crankcase lubricants as well as transmission lubricants.

A key advantage of this invention is the multifunctional nature of the molybdenum/diarylamine combination and the relatively low treat levels required for a performance benefit. This additive combination provides both oxidation control and friction control to the oil. This reduces the need for supplemental oxidation protection and frictional properties and should reduce the overall cost of the entire additive package. Further cost reduction is gained by the low treat levels employed.

DETAILED DESCRIPTION OF THE INVENTION

The molybdenum compound used in this invention can be any molybdenum compound which is soluble in the lubricant of formulated lubricant package and is substantially free of active sulfur. By "soluble" or "oil soluble" is meant that the compound is oil soluble or solubilized under normal blending conditions into the lubrication oil or concentrate thereof. "Active" sulfur is sulfur which is not fully oxidized. Active sulfur further oxidizes and becomes more acidic in the oil upon use. Illustratively, sulfur such as divalent sulfur is active sulfur whereas the sulfur in a sulfonate group is fully oxidized and thus non-active sulfur. It is preferred however that the molybdenum compound be substantially free of all sulfur. By "substantially free" we mean that the molybdenum compound contains less than about 0.5% by weight of the material in question, e.g., active sulfur which is generally an insufficient amount to add significantly to corrosion. The sulfur content of some commercially available molybdenum compounds can often have as much as about 1,000 ppm of sulfur as a contaminant and occasionally there can be as much as 2,000 ppm of the active sulfur. Such small amounts often come from contamination in processing the various ingredients involved. By "alkphenyl" or "alkaryl" we mean a phenyl or aryl group, respectively, which contains an alkyl substituent.

Oil soluble molybdenum compounds prepared from a molybdenum source such as ammonium molybdates, alkali and alkaline earth metal molybdates, molybdenum trioxide, and molybdenum acetylacetonates and an active hydrogen compound such as alcohols and polyols, primary and secondary amines and polyamines, phenols, ketones, anilines, etc. can be used in combination with the diarylamines in this invention. The following listing provides examples of some molybdenum compounds which are substantially free of active sulfur and that may be used in combination with diarylamines in this invention:

1. Glycol molybdate complexes as described by Price et al in U.S. Pat. No. 3,285,942 of Nov. 15, 1966;
2. Overbased alkali metal and alkaline earth metal sulfonates, phenates and salicylate compositions containing molybdenum such as those disclosed and claimed by Hunt et al in U.S. Pat. No. 4,832,857 of May 23, 1988 which is incorporated herein by reference in its entirety. The sulfur in the compounds of Hunt et al does not provide antioxidant protection in the oil, i.e., the activity of the sulfur is deactivated by the overbased nature of these additives. Indeed, it is generally known that the molybdenum-free sulfonates act as pro-degradants in the oil (Atmospheric Oxidation and Stabilization" by T. Colclough page 49). The main purpose for adding the molybdenum-free overbased sulfonates is to provide detergency. When used in combination with diarylamines, the overbased molybdenum sulfonates such as those described by Hunt et al are expected to provide synergistic antioxidant protection to lubricants. The molybdenum containing overbased alkaline earth metal and alkali metal sulfonates, phenates, and salicylates are prepared by a process which comprises:
   (a) introducing into a reaction zone a compound selected from the group consisting of a sulfonate, a phenate, and a salicylate wherein said compound is an overbased alkaline earth or alkali metal compound; (b) adding to said reaction zone a solvent to solubilize said compound and to form a mixture A; (c) heating said mixture A to an elevated temperature of 120° F. or less; (d) preparing an aqueous solution of a molybdenum compound at a temperature of 120° F. or less; (e) adding said aqueous solution of said molybdenum compound to said mixture A with stirring during a period of about 15 minutes or less to form a mixture B; (f) adding said mixture B containing said molybdenum compound to a non-polar compound at a temperature of 220° F. or greater within a period of up to 40 minutes wherein resulting mixture C during said addition is at a temperature of a least 220° F.; (g) driving off said water and said non-polar compound as overhead by increasing temperature of said mixture C containing said molybdenum compound to about 240° F. to about 300° F. to obtain a water-free composition; (h) adding additional quantity of a non-polar compound to said water-free composition to dilute said composition to clarify said composition by filtration or centrifugation; (i) heating said clarified composition to a temperature of from about 300° F. to about 400° F. to remove solvent and said non-polar compound and to recover product comprising an overbased molybdenum-containing alkaline earth metal or alkali metal compound.
3. Molybdenum complexes prepared by reacting a fatty oil, a diethanolamine and a molybdenum source as described by Rowan et al in U.S. Pat. No. 4,889,647 of Dec. 26, 1989;
4. Molybdenum containing compounds prepared from fatty acids and 2-(2-aminoethyl)aminoethanol as described by Karol in U.S. Pat. No. 5,137,647 of Aug. 11, 1992;
5. Overbased molybdenum complexes prepared from amines, diamines, alkoxylated amines, glycols and polyols as described by Gallo et al in U.S. Pat. No. 5,143,633 of Sep. 1, 1992; and
6. 2,4-Heteroatom substituted-molybdena-3,3-dioxacycloalkanes as described by Karol in U.S. Pat. No. 5,412,130 of May 2, 1995.

Molybdenum salts such as the carboxylates are a preferred group of molybdenum compounds. The molybdenum salts used in this invention may be completely dehydrated (complete removal of water during preparation), or partially dehydrated. They may be salts of the same anion or mixed salts, meaning that they are formed from more than one type of acid. Illustrative of suitable anions there can be mentioned chloride, carboxylate, nitrate, sulfonate, or any other anion.

The molybdenum carboxylates may be derived from any organic carboxylic acid. The molybdenum carboxylate is preferably that of a monocarboxylic acid such a that having from about 4 to 30 carbon atoms. Such acids can be hydrocarbon aliphatic, alicyclic, or aromatic carboxylic acids. Monocarboxylic acids such as those of aliphatic acids having about 4 to 18 carbon atoms are preferred, particularly those having an alkyl group of about 6 to 18 carbon atoms. The alicyclic acids may generally contain from 4 to 12 carbon atoms. The aromatic acids may generally contain one or two fused rings and contain from 7 to 14 carbon atoms wherein the carboxyl group may or may not be attached to the ring. The carboxylic acid can be a saturated or unsaturated fatty acid having from about 4 to 18 carbon atoms. Examples of some carboxylic acids that may be used to prepare the molybdenum carboxylates include: butyric acid; valeric acid; caproic acid heptanoic acid; cyclohexanecarboxylic acid; cyclodecanoic acid; naphthenic acid; phenyl acetic acid; 2- methylhexanoic acid; 2-ethylhexanoic acid; suberic acid; octanoic acid; nonanoic acid; decanoic acid; undecanoic acid; lauric acid, tridecanoic acid; myristic acid; pentadecanoic acid; palmitic acid; linolenic acid; heptadecanoic acid; stearic acid; oleic acid; nonadecanoic acid; eicosanoic acid; heneicosanoic acid; docosanoic acid; and erucic acid.

A number of methods have been reported in the literature for preparing the molybdenum carboxylates, e.g., U.S. Pat. No. 4,593,012 of Jun. 3, 1986 to Usui and U.S. Pat. No. 3,758,690 of May 11, 1971 to Becker, both of which are incorporated herein by reference in their entirety. The Usui patent describes the production of hydrocarbon soluble salts (molybdenyl carboxylates) by reaction of an ammonium molybdate with a carboxylic acid in the presence of an organic amine at specified elevated temperatures while removing water. U.S. Pat. No. 3,578,690 prepares its molybdenum carboxylates by reacting molybdenum oxide, molybdenum halide, alkali earth molybdate, alkaline earth molybdate, ammonium molybdate or mixtures of molybdenum sources with carboxylic acids at elevated temperatures and with removal of water.

The exact composition of the oil soluble molybdenum carboxylates can vary. Most of the literature refers to these compounds as molybdenum carboxylates. They have also been referred to as molybdenum carboxylate salts, molybdenyl ($MoO_2^{2+}$) carboxylates and molybdenyl carboxylate salts, molybdenum carboxylic acid salts, and molybdenum salts of carboxylic acids.

The concentration of the molybdenum from the molybdenum compound in the lubricant composition can vary depending upon the customer's requirements and applications. The actual amount of molybdenum added is based on the desired final molybdenum level in the lubricating composition. From about 100 to 450 parts per million of molybdenum are used in this invention based on the weight of the lubricating oil composition which may be formulated to contain additional additives and preferably about 100 to 250 parts per million of molybdenum and particularly 125 to 250 ppm are used based on the weight of the lubricating oil composition. The quantity of additive, e.g., molybdenum carboxylate to provide molybdenum, is based on the total weight of the formulated or unformulated lubricating oil composition.

The secondary diarylamines are well known antioxidants and there is no particular restriction on the type of secondary diarylamine used in the invention. Preferably, the secondary diarylamine antioxidant has the general formula:

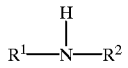

wherein $R^1$ and $R^2$ each independently represents a substituted or unsubstituted aryl group having from 6 to 30 carbon atoms. Illustrative of substituents for the aryl there can be mentioned aliphatic hydrocarbon groups such as alkyl having from about 1 to 20 carbon atoms, hydroxy, carboxyl or nitro, e.g., an alkaryl group having from 7 to 20 carbon atoms in the alkyl group. The aryl is preferably substituted or unsubstituted phenyl or naphthyl, particularly wherein one or both of the aryl groups are substituted with an alkyl such as one having from 4 to 18 carbon atoms. It is further preferred that both aryl groups be substituted, e.g. alkyl substituted phenyl.

The secondary diarylamines used in this invention can be of a structure other than that shown in the above formula which shows but one nitrogen atom in the molecule. Thus, the secondary diarylamine can be of a different structure provided that at least one nitrogen has 2 aryl groups attached thereto, e.g., as in the case of various diamines having a secondary nitrogen atom as well as two aryls on one of the nitrogens. The secondary diarylamines used in this invention preferably have antioxidant properties in lubricating oils, even in the absence of the molybdenum compound.

The secondary diarylamines used in this invention should be soluble in the formulated crankcase oil package. Examples of some secondary diarylamines that may be used in this invention include: diphenyl amine; various alkylated diphenylamines, 3-hydroxydiphenylamine; N-phenyl-1,2-phenylenediamine; N-phenyl-1,4-phenylenediamine; dibutyldiphenylamine; dioctyldiphenylamine; dinonyldiphenylamine; phenyl-alipha-naphthylamine; phenyl-beta-naphthylamine; diheptyldiphenylamine; and p-oriented styrenated diphenylamine.

The concentration of the secondary diarylamine in the lubricating composition can vary depending upon the customer's requirements and applications. A practical diarylamine use range in the lubricating composition is from about 750 parts per million to 5,000 parts per million (i.e. 0.075 to 0.5 wt %), preferably the concentration is from 1,000 to 4,000 parts per million (ppm) and particularly from about 1,200 to 3,000 ppm by weight. Quantities of less than 750 ppm have little or minimal effectiveness whereas quantities larger than 5,000 ppm are not economical.

Preferably, the quantity of molybdenum in relation to the quantity of the secondary amine should be within a certain ratio. The quantity of molybdenum should be about 0.020 to 0.6 parts by weight for each part by weight of the amine in the lubricating oil composition. Preferably, this ratio will be from about 0.040 to 0.40 parts of the molybdenum per part of the amine and particularly about 0.05 to 0.3 parts of the molybdenum per part of the amine. The total quantity of molybdenum and amine can be provided by one or more than one molybdenum or amine compound.

The composition of the lubricant oil can vary significantly based on the customer and specific application. In general, the oil is a formulated oil which is composed of between 75 and 95 wt % of a mineral lubrication oil, between 0 and 10 wt % of a polymeric viscosity index improver, and between about 5 and 15 wt % (weight percent) of an additive package. The additive package generally contains the following components:

(a) Dispersants. The dispersants are nonmetallic additives containing nitrogen or oxygen polar groups attached to a high molecular weight hydrocarbon chain. The hydrocarbon chain provides solubility on the hydrocarbon base stocks. The dispersant functions to keep oil degradation products suspended in the oil. Examples of commonly used dispersants include copolymers such as polymethacrylates and styrenemaleinic ester copolymers, substituted succinamides, polyamine succinamides, polyhydroxy succinic esters, substituted mannich bases, and substituted triazoles. Generally, the dispersant is present in the finished oil between about 4.0 and8.5 wt %.

(b) Detergents. The detergents are metallic additives containing charged polar groups, such as sulfonates or carboxylates, with aliphatic, cycloaliphatic, or alkylaromatic chains, and several metal ions. The detergents function by lifting deposits from the various surfaces of the engine. Examples of commonly used detergents include neutral and overbased alkali and alkaline earth metal sulfonates, neutral and overbased alkali and alkaline earth metal phenates, sulfurized phenates, overbased alkaline earth salicylates, phosphonates, thiopyrophosphonate, and thiophosphonates. Generally, the detergents are present in the finished oil between about 1.0 and 2.5 wt %.

(c). ZDDP's. The ZDDP's (zinc dihydrocarbyl dithiophosphates) are the most commonly used antiwear additives in formulated lubricants. These additives function by reaction with the metal surface to form a new surface active compound which itself is deformed and thus protects the original engine surface. Other examples of anti-wear additives include tricresol phosphate, dilauryl phosphate, sulfurized terpenes and sulfurized fats. The ZDDP's also function as antioxidants. Generally, the ZDDP is present in the finished oil between about 1.0 and 1.5 wt %, although when used, they can be used at substantially lower concentrations, e.g., 0.5 wt %. It is desirable from environmental concerns to have lower levels of ZDDP.

(d). Antioxidants. In molybdenum-free oils other antioxidants in addition to the zinc dihydrocarbyl dithiophosphates are used to protect the oil from oxidative degradation. The amount of supplemental antioxidant will vary depending on the oxidative stability of the base stock. Typical treat levels in finished oils can vary from about 1.0 to 2.5 wt %. The supplementary antioxidants that are generally used include hindered phenols, hindered bisphenols, sulfurized phenols, alkylated diphenylamines, sulfurized olefins, alkyl sulfides and disulfides, dialkyl dithiocarbamates,and phenothiazines. The inclusion of molybdenum carboxylates with diphenylamines removes the need for these supplementary antioxidatives. However, a supplementary antioxidant may be included in oils that are less oxidatively stable or in oils that are subjected to unusually severe conditions.

The lubrication oil component of this invention may be selected from any of the synthetic or natural oils used as lubricants such as that for crankcase lubrication oils for spark-ignited and compression-ignited internal combustion engines, for example automobiles and truck engines, marine, and a railroad diesel engines. Synthetic base oils include alkyl esters of dicarboxylic acids, polyglycols and alcohols, poly-alpha-olefins, including polybutenes, alkyl benzenes, organic esters of phosphoric acids, and polysilicone oils.

Natural base oils include mineral lubrication oils which may vary widely as to their crude source, e.g., as to whether they are paraffinic, naphthenic, or mixed paraffinic-naphthenic.

The lubrication oil base stock conveniently has a viscosity of about 2.5 to about 15 cSt or $mm^2/s$ and preferably about 2.5 to about 11 cSt or $mm^2/s$ at 100° C.

A polymeric viscosity index improver (VII) component may be used in this invention and such component may be selected from any of the known viscosity index improvers. The function of the VII is to reduce the rate of change of viscosity with temperature, i.e. they cause minimal increase in engine oil viscosity at low temperature but considerable increase at high temperature. Examples of viscosity index improvers include polyisobutylenes, polymethacrylates, ethylene/propylene copolymers, polyacrylates, styrene/maleic ester copolymers, and hydrogenated styrene/butadiene copolymers.

In addition to the lubricant additives mentioned thus far, there is sometimes a need for other supplemental additives that perform specific functions not provided by the main components. These additional additives include, pour point depressants, corrosion inhibitors, rust inhibitors, foam inhibitors and supplemental friction modifiers.

The lubricating oil compositions of this invention can be made by adding the molybdenum additive and the secondary diarylamine additive in a lubricant oil composition. In the case of a formulated oil, the composition can also contain additional additives such as dispersants, detergents, zinc dihydrocarbyl dithiophsophates, and still additional antioxidants. The method or order of component addition is not critical. Alternatively, the combination of molybdenum and amine additives can be added to the lubrication oil as a concentrate with or without such concentrate containing the remaining additives.

The lubricating oil concentrate will comprise a solvent and from about 2.5 to 90 weight percent (wt %) and preferably 5 to 75 wt % of the combination of the molybdenum additive and amine additive of this invention. The solvent may be that of hydrocarbon oils, e.g., mineral lubrication oil or a synthetic oil. The ratio of molybdenum to amine in the concentrate composition is from about 0.02 to 0.6 parts of molybdenum per part of amine and preferably from about 0.04 to 0.4 parts of molybdenum for each part of the amine by weight. In addition to the molybdenum and amine additives of this invention, the concentrate may contain additional additives as is conventional in the art, e.g., dispersants, detergents, and zinc dihydrocarbyl dithiophosphates.

There are a number of recent trends in the petroleum additive industry that may restrict, and/or limit, the use of certain additives in formulated crankcase oils. The key trends are the move to lower phosphorus levels in the oil, the new fuel economy requirements and the move to more severe engine test conditions for qualifying oils. Such changes may show that certain currently used antioxidant additives are no longer effective in protecting the oil against oxidation. The molybdenum/diarylamine based antioxidant mixture disclosed herein provides a solution to this need. Furthermore, there is concern that phosphorus from the lubricant tends to poison catalyst used in catalytic converters, thereby preventing them from functioning to full effect. Also, active sulfur containing antioxidants, including active sulfur containing molybdenum compounds are known to cause copper corrosion. This is generally known and has been disclosed by T. Colelough in Atmospheric oxidation and Antioxidants, Volume II, chapter 1, Lubrication Oil Oxidation and Stabilization, G. Scott, editor, 1993 Elsevier Science Publishers.

The molybdenum compound in this invention is preferably substantially free of phosphorus and substantially free of active sulfur and it is particularly preferred to have the molybdenum compound substantially free of sulfur whether active or otherwise.

The following examples are illustrative of the invention and its advantageous properties. In these examples as well as elsewhere in this application, all parts and percentages are by weight unless otherwise indicated.

EXAMPLE 1

The following example shows the antioxidant synergism that exist,; when molybdenum naphthenate and a diphenylamine are formulated into an ADE Grade 5W-30 type motor oil. The example also shows that this antioxidant behavior is unique when compared to other metals.

A variety of oil soluble metals and one diphenylamine type antioxidant were blended into an ADE Grade 5W-30 type motor oil as shown in Table 1. The only additional antioxidant in these blends were the zinc dialkyldithiophosphate. The oxidation stability of these oils was measured by pressurized differential scanning calorimetry (PDSC) as described by J. A. Walker and W. Tsang in "Characterization of Lubrication Oils by Differential Scanning Calorimetry", SAE Technical Paper Series, 801383 (Oct. 20–23, 1980). Oil samples were treated with an iron (III) acetylacetonate catalyst (55 ppm Fe) and 2 milligrams (mg) were analyzed in an open aluminum hermetic pan. The DSC cell was pressurized with 500 psi air and programmed with the following heating sequence: (1) jump from ambient to 165° C., (2) jump from 165° C. to 175° C. at 2 C/min, (3) isothermal at 175° C. The oil samples were held at 175° C. until an exothermic release of heat was observed. The exothermic release of heat marks the oxidation reaction. The time from the start of the experiment to the exothermic release of heat is called the oxidation induction time and is a measure of the oxidative stability of the oil (i.e. the longer the oxidation induction time the greater the oxidative stability of the oil). All oils are evaluated in duplicate and the results averaged. As shown in Table 1 the oil samples containing both molybdenum naphthenate and diphenylamine had the longest oxidation induction times. These oil samples also contain other metals. In order to rule out the possibility of the other metal contributing to the improved oxidative stability of the oils, the oxidation induction time data were analyzed for main and interaction effects as described by G. E. P. Box, W. G. Hunter, and J. S. Hunter in "Statistics for Experiments", 1978, John Wiley & Sons. The results are provided in Table IA. The results show the following:

1. The improved oxidative stability of the oil is predominantly due to the presence of molybdenum naphthenate and diphenylamine.
2. There is a strong interaction effect, i.e. synergism, between molybdenum naphthenate and the diphenylamine.

The other metals show very little effect, or a negative effect, on the oxidative stability of the oil. In addition, the other metals show no interaction effect, or a negative interaction effect, with the diphenylamine.

In the below Tables I and IA: Ce Nap is cesium naphthenate; Co Nap is cobalt naphthenate; Ni Oct is nickel octanoate; and Mo Nap is molybdenum naphthenate. The concentration of metallic additives is expressed in parts per million of the metal. DPA is dinonyldiphenylamine which is expressed in percent by weight, e.g. 0.1 wt % being 1,000 ppm; Induction Time is the DSC Induction Time in minutes as an average.

TABLE I

PDSC Induction Times for Motor Oi1 Blends

| | Concentration of Additives In SAE Grade 5W-30 Type Motor Oil* | | | | | | |
|---|---|---|---|---|---|---|---|
| Oil No. | Ce Nap | Co Nap | Ni Oct | Mo Nap | DPA | Process Oil Wt. % | Induction Time |
| 1 | 0 | 0 | 0 | 0 | 0.10 | 1.50 | 41.8 |
| 2 | 200 | 0 | 0 | 0 | 0.00 | 1.27 | 16.5 |
| 3 | 0 | 200 | 0 | 0 | 0.00 | 1.27 | 26.4 |
| 4 | 200 | 200 | 0 | 0 | 0.10 | 0.83 | 26.5 |
| 5 | 0 | 0 | 200 | 0 | 0.00 | 1.35 | 16.1 |
| 6 | 200 | 0 | 200 | 0 | 0.10 | 0.92 | 28.1 |
| 7 | 0 | 200 | 200 | 0 | 0.10 | 0.92 | 33.5 |
| 8 | 200 | 200 | 200 | 0 | 0.00 | 0.68 | 22.7 |
| 9 | 0 | 0 | 0 | 200 | 0.00 | 1.27 | 24.7 |
| 10 | 200 | 0 | 0 | 200 | 0.10 | 0.83 | 60.1 |
| 11 | 0 | 200 | 0 | 200 | 0.10 | 0.83 | 62.5 |
| 12 | 200 | 200 | 0 | 200 | 0.00 | 0.60 | 34.6 |
| 13 | 0 | 0 | 200 | 200 | 0.10 | 0.92 | 72.4 |
| 14 | 200 | 0 | 200 | 200 | 0.00 | 0.68 | 26.0 |
| 15 | 0 | 200 | 200 | 200 | 0.00 | 0.68 | 40.9 |
| 16 | 200 | 200 | 200 | 200 | 0.10 | 0.25 | 54.2 |

*A formulated crankcase oil containing 83.2 wt % base oil, 6.2 wt % polymeric viscosity index improver, 6.9 wt % ashless dispersant, 2.1 wt % calcium, sodium & magnesium overbased & neutral detergents, and 1.2 wt % zinc dialkyldithiophosphate.

TABLE IA

Main Effects and Interaction Effects On PDSC Oxidation Induction Time

| Factors and Interactions | Main Effect (minutes) | Interaction Effect (minutes) |
|---|---|---|
| Ce Na | −6.2 | |
| Co Nap | 2.0 | |
| Ni Oct | 0.1 | |
| Mo Nap | 20.5 | |
| DPA | 21.4 | |
| Ce Nap with Co Nap | | −0.2 |
| Ce Nap with Ni Oct | | −1.8 |
| Ce Nap with Mo Nap | | −0.2 |
| Co Nap with Ni Oct | | 0.2 |
| Co Nap with Mo Nap | | 0.3 |
| Ni Oct with Mo Nap | | 2.8 |
| Mo Nap with DPA | | 9.4 |
| Ni Oct with DPA | | −0.8 |
| Co Nap with DPA | | −8.4 |
| Ce Nap with DPA | | −4.1 |

EXAMPLE 2

Molybdenum naphthenate and alkylated diphenylamine, Naugalube 680, from Uniroyal Chemical Company; were blended into an SAE Grade 5W-30 type motor oil as shown in Table II. The only additional antioxidant in these blends was the zinc dialkyldithiophosphate. The oxidation stability of these oils was measured by pressurized differential scanning calorimetry (PDSC) as described in Example 1. These oils were also subjected to the following hot oil oxidation test: Into 25 grams (g) of each motor oil was blended 0.8 g of a catalyst mixture containing 5.55 wt % iron (III) naphthenate (6 wt % Fe content) and 94.45 wt % xylenes. Dry air was blown through the oil at rates of 10 Liters (L)/hour (h) while maintaining the temperature at 160° C. for a period of 72 hours. The oil was cooled and the percent change in viscosity between the new oil and the oxidized oil wad determined at 40° C. A lower percent change in viscosity for an oil is an indication of less oil degradation and thus better oxidation control by the additives. All oils were evaluated in duplicate and the results averaged. Results from the PDSC and the hot oil oxidation test are found in Table II. Both the PDSC results and the hot oil oxidation test results show that the combination of molybdenum naphthenate (Mo-Nap) and alkylated diphenylamine (N-680) provides superior oxidation control versus use of these additives separately. Note that for the samples containing a combination of molybdenum naphthenate and the diphenylamine the measured oxidation induction time values are significantly larger than the expected values. The expected values are what one would observe if there was no synergism between the molybdenum naphthenate and the diphenylamine, i.e. the additives act independently of each other. Expected values are calculated by adding the increase in induction time due to the individual additives. The much larger measured induction time values versus the expected values clearly show the molybdenum naphthenate/diphenylamine synergism. In the following Table II, the concentration of the molybdenum naphthenate is expressed in ppm of molybdenum whereas the concentration of the N-680 Amine is expressed in weight percent, i.e. 0.1 wt % is equal to 1,000 ppm. The oxidation induction time by PDSC in minutes is in the column headed as "Induction Time", The OIT expected response in minutes is in the column under "Expected Time"; the viscosity increase from 72 hour HOOT (%) is an average of duplicate runs and is under the column headed "Viscosity Increase".

TABLE II

Oxidative Stability of Motor oil Blends* by PDSC and the Hot Oil Oxidation Test

| Oil # | Concentration of Additives Mo Nap (As ppm Mo) | N-680 Wt % | Process Oil Wt % | Induction Time | Expected Time | Viscosity Increase |
|---|---|---|---|---|---|---|
| 1 | 0 | 0.000 | 1.25 | 28.4 | 28.4 | 303.18 |
| 2 | 125 | 0.000 | 1.04 | 35.1 | 35.1 | 671.48 |
| 3 | 250 | 0.000 | 0.83 | 33.0 | 33.0 | 362.22 |
| 4 | 0 | 0.075 | 1.18 | 44.9 | 44.9 | 44.64 |
| 5 | 125 | 0.075 | 0.97 | 63.5 | 51.6 | 36.93 |
| 6 | 250 | 0.075 | 0.76 | 73.0 | 49.5 | 66.10 |
| 7 | 0 | 0.150 | 1.10 | 62.5 | 62.5 | 31.61 |
| 8 | 125 | 0.150 | 0.89 | 107.8 | 69.2 | 11.93 |
| 9 | 250 | 0.150 | 0.68 | 108.7 | 67.1 | 10.02 |

*A formulated crankcase oil containing 83.2 wt % base oil, 6.2 wt % polymeric viscosity index improver, 6.9 wt % ashless dispersant, 2.1 wt % calcium, sodium, and magnesium overbased and neutral detergents, and 1.2 wt % zinc dialkyldithiophosphate.

EXAMPLE 3

The following example shows that other classes of amines, e.g., certain substituted amines, disubstituted phenylene diamines, and alkyl amines, are not effective or minimally effective at controlling oxidation when used in combination with molybdenum carboxylates.

Molybdenum naphthenate and a variety of amines, were blended into an SAE Grade 5W-30 type motor oil (formulated crankcase oil as described in Example 2) as shown in Table III and as further described below. The only additional antioxidant in these blends was the zinc dialkyl dithiophosphate. The oxidation stability of these oils was measured by pressurized differential scanning calorimetry (PDSC) as described in Example 1. These oils were also subjected to the hot oil oxidation test described in Example 2.

Both the hot oil oxidation test results (small percentage changes in viscosity) and the PDSC test results (prolonged oxidation induction times) show that the combination of molybdenum naphthenate and alkylated diarylamines is more effective than the individual additives. Phenylnaphthyl amines show some effectiveness when used in combination with molybdenum naphthenate. The substituted anilines, substituted phenylene diamines, and alkyl amines, were much less effective when used in combination with molybdenum naphthenate. In fact, the hot oil oxidation test results show that many of these other amines show a prodegradant effect (large percent changes in viscosity versus oil #0) when used in combination with molybdenum naphthenate.

The results of the tests of Example 3 are shown in Table III. In Table III, the first column is the test number involved. The column headed "A" shows the concentration of molybdenum naphthenate expressed in ppm of molybdenum. The remaining columns "B" through "J" show concentrations in weight percent wherein column "B" is that of dinonyl diphenylamine; column "C" is an alkylated diphenylamine trade named Naugalube 680, from Uniroyal Chemical Company; "D" is phenyl-alpha-naphthylamine; "E" is disecbutyl phenylenediamine; "F" is 4-tetradecylaniline; "G" is 2,5-di-t-butylaniline; "H" is 2,6-diisopropyl aniline; "T" is di-n-decylamine; and "J" is that of process oil. The results of these tests are shown in Table IIIA wherein for each of the numbered oil samples there is shown the results of the tests of Table III.

TABLE III

Oxidation of Motor Oil Containing Molybdenum Naphthenates and Amines

| | Concentration of additives in SAE Grade 5W-30 Type Motor Oil* | | | | | | | | | |
|---|---|---|---|---|---|---|---|---|---|---|
| Oil | A | B | C | D | E | F | G | H | I | J |
| 0 | 0 | 0.00 | 0.00 | 0.00 | 0.00 | 0.00 | 0.00 | 0.00 | 0.00 | 1.25 |
| 1 | 200 | 0.00 | 0.00 | 0.00 | 0.00 | 0.00 | 0.00 | 0.00 | 0.00 | 0.92 |
| 2 | 0 | 0.10 | 0.00 | 0.00 | 0.00 | 0.00 | 0.00 | 0.00 | 0.00 | 1.15 |
| 3 | 200 | 0.10 | 0.00 | 0.00 | 0.00 | 0.00 | 0.00 | 0.00 | 0.00 | 0.82 |
| 4 | 0 | 0.00 | 0.10 | 0.00 | 0.00 | 0.00 | 0.00 | 0.00 | 0.00 | 1.15 |
| 5 | 200 | 0.00 | 0.10 | 0.00 | 0.00 | 0.00 | 0.00 | 0.00 | 0.00 | 0.82 |
| 6 | 0 | 0.00 | 0.00 | 0.10 | 0.00 | 0.00 | 0.00 | 0.00 | 0.00 | 1.15 |

TABLE III-continued

Oxidation of Motor Oil Containing Molybdenum Naphthenates and Amines

| | Concentration of additives in SAE Grade 5W-30 Type Motor Oil* | | | | | | | | | |
|---|---|---|---|---|---|---|---|---|---|---|
| Oil | A | B | C | D | E | F | G | H | I | J |
| 7 | 200 | 0.00 | 0.00 | 0.10 | 0.00 | 0.00 | 0.00 | 0.00 | 0.00 | 0.82 |
| 8 | 0 | 0.00 | 0.00 | 0.00 | 0.10 | 0.00 | 0.00 | 0.00 | 0.00 | 1.15 |
| 9 | 200 | 0.00 | 0.00 | 0.00 | 0.10 | 0.00 | 0.00 | 0.00 | 0.00 | 0.82 |
| 10 | 0 | 0.00 | 0.00 | 0.00 | 0.00 | 0.10 | 0.00 | 0.00 | 0.00 | 1.15 |
| 11 | 200 | 0.00 | 0.00 | 0.00 | 0.00 | 0.10 | 0.00 | 0.00 | 0.00 | 0.82 |
| 12 | 0 | 0.00 | 0.00 | 0.00 | 0.00 | 0.00 | 0.10 | 0.00 | 0.00 | 1.15 |
| 13 | 200 | 0.00 | 0.00 | 0.00 | 0.00 | 0.00 | 0.10 | 0.00 | 0.00 | 0.82 |
| 14 | 0 | 0.00 | 0.00 | 0.00 | 0.00 | 0.00 | 0.00 | 0.10 | 0.00 | 1.15 |
| 15 | 200 | 0.00 | 0.00 | 0.00 | 0.00 | 0.00 | 0.00 | 0.10 | 0.00 | 0.82 |
| 16 | 0 | 0.00 | 0.00 | 0.00 | 0.00 | 0.00 | 0.00 | 0.00 | 0.10 | 1.15 |
| 17 | 200 | 0.00 | 0.00 | 0.00 | 0.00 | 0.00 | 0.00 | 0.00 | 0.10 | 0.82 |

*A formulated crankcase oil containing 83.2 wt % base oil, 6.2 wt % polymeric viscosity index improver, 6.9 ashless dispersant, 2.1 wt % calcium, sodium and magnesium over-based & neutral detergents, and 1.2 wt % zinc dialkyldithiophosphate.

TABLE IIIA

| Oil # | Oxidation Induction Time By PDSC (min) Avg From Duplicate Runs | Viscosity Increase From 72 h HOOT (%) Avg From Duplicate Runs |
|---|---|---|
| 0 | 41.8 | 510.6 |
| 1 | 54.0 | 1650.2 |
| 2 | 72.9 | 89.3 |
| 3 | 111.2 | 59.5 |
| 4 | 81.8 | 68.3 |
| 5 | 102.8 | 48.8 |
| 6 | 66.8 | 129.1 |
| 7 | 74.3 | 102.2 |
| 8 | 61.3 | 150.6 |
| 9 | 62.6 | 417.3 |
| 10 | 40.8 | 728.1 |
| 11 | 41.8 | 1387.4 |
| 12 | 40.3 | 534.2 |
| 13 | 48.2 | 1058.8 |
| 14 | 34.2 | 463.2 |
| 15 | 46.2 | 561.7 |
| 16 | 39.9 | 305.0 |
| 17 | 39.7 | 905.8 |

EXAMPLE 4

Molybdenum octoate and alkylated diphenylamine. Naugalube 680, from Uniroyal Chemical Company, were blended into an SAE grade 5W-30 type motor oil as shown in Table IV. The only additional antioxidant in these blends was the zinc dialkyldithiophosphate. The frictional properties of these oils were measured using the High Frequency Reciprocating Rig. In this instrument 1–2 mls (milliliters) of a sample oil are placed in a temperature controlled steel pan. A steel ball attached to a moveable arm is lowered into the pan. A load of 400 g is applied to the steel ball/arm assembly. The steel/ball arm assembly is oscillated at 20 Hz over a 1 mm (millimeter) path length. As the arm is oscillated, a friction coefficient is determined every 5 seconds. The test lasts 3 minutes so approximately 30 data points are averaged to determine the friction coefficient of an oil in a given test. A reduction in the friction coefficient corresponds to improved friction properties of the oil. Duplicate tests were performed on each oil at 70° C., 100° C., and 130° C. The average friction coefficient and standard deviation (SD) for each sample are shown in Table IV.

It can be seen from Table IV that an improvement in friction properties (lower coefficient of friction) results when the concentration of molybdenum octoate is increased in the oil. Reference oil 5 (R5) shows that a conventional antioxidant is not as effective as a friction modifier compared to molybdenum octanoate.

In Table IV: "Mo-Oct." is molybdenum octoate; "N-680" is alkylated diphenylamine; "t-Bu" is t-butylphenols; and "PO" is process oil.

TABLE IV

Frictional Properties Of Motor Oil Blends using the High Frequency Reciprocating Rig Test

| | Concentration of additives in SAE GRADE 5W-30 TYPE MOTOR OIL | | | | FRICTION COEFFICIENT | | | | | |
|---|---|---|---|---|---|---|---|---|---|---|
| | Mo-Oct | A-N-680 | t-Bu | P.O. | | | | | | |
| Oil | ppm | wt % | wt % | wt % | 70 C | SD | 100 C | SD | 130 C | SD |
| R1 | 0 | 0 | 0 | 0 | 0.117 | 0.001 | 0.116 | 0.001 | 0.116 | 0.001 |
| 2 | 204 | 0.125 | 0 | 0.375 | 0.117 | 0.001 | 0.113 | 0.002 | 0.113 | 0.001 |
| 3 | 319 | 0.125 | 0 | 0 | 0.110 | 0.001 | 0.104 | 0.004 | 0.106 | 0.004 |
| 4 | 432 | 0.125 | 0 | 0 | 0.105 | 0.001 | 0.095 | 0.001 | 0.092 | 0.001 |
| Rs | 0 | 0.125 | 0.70 | 0.375 | 0.125 | 0.001 | 0.128 | 0.002 | 0.127 | 0.003 |

EXAMPLE 5

This example shows that the benefit of the molybdenum/diphenylamine combination requires using at least 100 ppm of the molybdenum. As shown in Example 6, this enhanced oxidation performance starts to break down at extremely high levels( greater than 400 ppm) of molybdenum.

Molybdenum 2-ethylhexanoate, containing 13.0 wt % molybdenum and alkylated diphenylamine, Naugalube 680, from Uniroyal Chemical Company, were blended into an SAE grade 5W-30 motor oil as shown in Table V below. The control 5W-30 motor oil contained the following additives:

| Formulated Motor Oil Components | Weight % |
|---|---|
| ZDDP | 1.1 |
| Ashless dispersant | 7.0 |
| Viscosity Index Improver | 7.0 |
| Neutral & Overbased Detergents | 1.4 |
| Pour Point Depressant | 0.5 |
| Diluent Oil | 83.0 |

The oxidative stability of these oils was measured by using the following Hot Oil Oxidation Test: Into 25 g of each motor oil was blended 0.8 g of catalyst mixture containing 5.55 wt % Iron (III) Naphthenate (6 wt % Fe content) and 94.45 wt % xylenes. Dry air was blown through the oil at a rate of 10 L/h (liters per hour) while maintaining the temperature at 160° C. for a period of 64 hours. The oil was cooled and the percent change in viscosity between the new oil and the oxidized oil was determined at 40° C. The lower percent change in viscosity for an oil is an indication of less oil degradation and thus better oxidation control by the additives. The abbreviation "% visc Incr" in Table V relates to percent viscosity increase. All oils were evaluated in duplicate and the results averaged. The results are found in Table IV.

TABLE V

Oxidative Stability of Motor Oil Blends By the Hot Oil Oxidation Test

| Sample | Amine N-680 wt % | Molybdenum 2-ethylhexanoate ppm Mo | % Viscosity Increase After 74 h in the HOOT | Change % Visc Incr |
|---|---|---|---|---|
| 0 | 0.15 | 0 | 70 | 0 |
| 1 | 0.15 | 52 | 69 | −1 |
| 2 | 0.15 | 104 | 68 | −2 |
| 3 | 0.15 | 156 | 49 | −21 |
| 4 | 0.15 | 208 | 43 | −27 |
| 5 | 0.15 | 260 | 46 | −24 |
| 6 | 0.15 | 312 | 35 | −35 |
| 7 | 0.15 | 364 | 32 | −38 |
| 8 | 0.15 | 416 | 27 | −43 |
| 9 | 0.15 | 468 | 23 | −47 |

The viscosity results in the above table clearly show that at molybdenum level of 104 ppm, the molybdenum/diarylamine combination showed but a small improvement for the oxidative stability of the oil. However, at molybdenum levels greater than 104 such as 156 ppm, a significant improvement in oxidation control is seen. The largest improvement occurs between 104 ppm and 156 ppm molybdenum content.

EXAMPLE 6

A sample of molybdenum octoate was diluted with paraffin oil, blended at 50° C. for 1 hour and filtered using a pressure filtration apparatus. The molybdenum content of the filtered oil was determined to be 2.91 wt %

The diluted and filtered molybdenum octoate sample described above, and alkylated diphenylamine, Naugalube 680, from Uniroyal Chemical Company, were blended into an SAE grade 5W-30 type motor oil as shown in Table VI. The control 5W-30 motor oil contained the components specified in Example 5 above. The oxidative stability of these oils was measured using the Hot Oil Oxidation Test described in Example 5. All oils were evaluated in duplicate and the results averaged. The results are found in Table VI.

TABLE VI

Oxidative Stability of Motor Oil Blends By the Hot Oil Oxidation Test

| Sample | Amine Wt % | PPM Mo | % Viscosity Increase | Change % Viscosity |
|---|---|---|---|---|
| 1 | 0.125 | 0 | 55 | 0 |
| 2 | 0.125 | 204 | 35 | −20 |
| 3 | 0.125 | 318 | 27 | −28 |
| 4 | 0.125 | 432 | 133 | 78 |

The viscosity results of the above Table VI clearly show that if a sufficient amount of amine is not present, a high molybdenum content becomes detrimental to the oxidative stability of the oil. In this example 0.125% amine with 318 ppm molybdenum provides good antioxidant protection. Increasing the molybdenum level to 432 ppm is not as effective as the lower concentrations to the oxidative stability of the oil (large increase in viscosity).

EXAMPLE 7

A series of lubrication formulations in accordance with this invention were tested in the Sequence IIIE engine test. The IIIE test uses a 231 CID (3.8 liter) Buick V-6 engine at high speed (3,000 pm) and a very high oil temperature of 149° C. for 64 hours. This test is used to evaluate an engine oil's ability to minimize oxidation, thickening, sludge, varnish, deposits, and wear. The formulations contained 7.0 wt % viscosity index improver, 7.0 wt % ashless dispersant, 1.1 wt % ZDDP, 1.4 wt % detergents, 0.5 wt % supplemental additives, with the remainder being mineral oil. The addition of supplemental antioxidants are indicated in Table VII along with the engine test results. Hindered, mixed t-butylphenol antioxidant, referred to as "Phenolic" in Table VII below and a secondary alkylated diphenylamine, referred to as "Amine" in Table VII below disclosed for use in this invention are commercially available. Formulation A, also simply referred to in the table as "A" contained no molybdenum. The molybdenum source in formulation B, simply referred to as "B" in the table is molybdenum octoate available from Shepherd Chemical Company. The molybdenum source in formulation C, simply referred to as "C" in the table, is molybdenum 2-ethylhexanoate available from OM Group. TVTM indicates that the oils viscosity was too viscous to measure and represents a severe failing result in the IIIE engine. Some of the abbreviations used in the below Table VII are as follows: "% Visc. Inc.@ 64 h" means percent viscosity increase in 64 hours; "AE Sludge" is average engine sludge rating; "APS Varnish" is average piston skirt varnish; "ORL Deposit" is oil ring land deposit; "AC Wear" is average cam wear; MC Wear is maximum cam wear; and "L" is liters.

TABLE VII

Sequence IIIE Evaluation of Molybdenum/Secondary Diphenylamine Antioxidants

| Result | Passing Limits | A | B | C |
|---|---|---|---|---|
| Phenolic Content (wt %) | | 0.7 | 0 | 0 |
| Amine Content (wt %) | | 0.1 | 0.125 | 0.2 |
| Molybdenum Content (ppm Mo) | | 0 | 458 | 115 |
| % Vis. Inc. @ 64 h | 375 Max. | TVTM | 152 | 300 |
| AE Sludge | 9.2 Min. | 9 | 9.54 | 9.56 |
| APS Varnish | 8.9 Min. | 7.96 | 9.1 | 9.38 |
| ORL Deposit | 3.5 Min. | 2.53 | 4.38 | 4.8 |
| Stuck Ring | | 2 | 2 | 1 |
| AC Wear | 30 Max. | 7.2 | 7.8 | 6.5 |
| MC Wear | 64 Max. | 15.0 | 12.00 | 11.00 |
| Oil Consumption in Liters | 5.1 Max | 4.35 | 3.32 | 3.35 |

The results of the above Table VII clearly show that the conventional phenolic antioxidant in Formulation A is ineffective in combination with the diphenylamine at controlling viscosity and passing the IIIE engine test. The molybdenum/diphenylamine combination in formulations B and C is very effective at both controlling viscosity and passing the engine test.

EXAMPLE 8

This example shows that the molybdenum carboxylate/diphenylamine combination is also effective in lubricants that do not contain additional additives. Alkylated diphenylamine, Naugalube 680, from Uniroyal Chemical Company, and molybdenum HEX-CEM, from OM Group, were blended into Petro Canada Paraflex HT100 (650N) base oil as described in Tabe VIII. These samples were subjected to the hot oil oxidation test described in Example 2 with the only change being that the heating period was reduced from 72 hours to 40 hours. The oils were cooled and the percent change in viscosity between the new oil and the oxidized oil was determined at 40° C. The results were shown in Table VIII below.

TABLE VIII

Hot Oil Oxidation Unadditized Base Oil In the Presence and Absence of Molybdenum.

| Oil # | Base Oil (wt %) | N-680 (wt %) | Mo HEX-CEM (ppm Mo) | % Change Visc. After 40 h |
|---|---|---|---|---|
| 1 | 99.75 | 0.25 | 0 | 318 |
| 2 | 99.65 | 0.25 | 130 | −2 |
| 3 | 99.55 | 0.25 | 260 | 1 |

It can be seen from the above Table VIII that significant improvement in oxidative stability of unadditized base oil occurs when a molybdenum carboxylate is combined with a secondary diarylamine.

EXAMPLE 19

The following example shows antioxidant synergism between molybdenum and a diarylamine wherein the molybdenum compound is not a carboxylate.

Molyvan855, a sulfur and phosphorus free organic amide molybdenum complex supplied by R. T. Vanderbilt Company, Inc. (CAS Reg. No. 64742-52-5), alkylated diphenylamine Naugalube 680, from Uniroyal Chemical Company, and process oil were blended into an SAE Grade 5W-30 type motor oil as shown in Table IX below. The formulated oil used in this example was the same as that used in Example 1. The only additional antioxidant in these blends was the zinc dialkyldithiophosphate. The oxidation stability of these oils was measured by pressurized differential scanning calorimetry (PDSC) as described in Example 1. These oils were also subjected to the hot oil oxidation test described in Example 2 with the only change being that the heating period was reduced from 72 hours to 64 hours. All oils were evaluated in duplicate or triplicate and the results averaged. The results are found in Table IX below. Both the PDSC results and the hot oil oxidation test results show that the combination of the organic amide molybdenum complex and the alkylated diphenylamine provides superior oxidation control versus use of these additives separately. Note that for samples containing a combination of Molyvan 855 and alkylated diphenylamine the measured values are significantly larger than the expected value. The expected values are what one would observe if there were no synergism between the Molyvan 855 and the alkylated diphenylamine, i.e., the additives act independently of each other. The much larger measured OIT values versus the expected values clearly show the organic amide molybdenum complex/diphenylamine synergism.

TABLE IX

| Oil | Molyvan 855 Added Wt % (ppm Mo) | N-680 Added Wt % | Process Oil Added Wt % | Induction Time (min) | Expected OIT (min) | Viscosity Increase (%) |
|---|---|---|---|---|---|---|
| A | 0 | 0 | 1.25 | 26.6 | | 201 |
| B | 0 | 0.1 | 1.15 | 59.4 | | 42 |
| C | 0.272 (200) | 0 | 0.98 | 50.8 | | 548 |
| D | 0.272 (200) | 0.1 | 0.88 | 106.2 | 83.6 | 25 |

What is claimed is:

1. A lubricating composition comprising a major amount of lubricating oil, an oil soluble molybdenum compound providing about 100 to 450 parts per million of molybdenum, said molybdenum compound selected from the group consisting of a sulfur and phosphorus free organic amide molybdenum complex and a molybdenum carboxylate wherein the carboxylate anion has from about 4 to 30 carbon atoms and about 750 to 5,000 parts per million of an oil soluble secondary diarylamine.

2. The composition of claim 1 wherein the carboxylate is that of a monocarboxylic aliphatic acid having from about 4 to 18 carbon atoms or an alicyclic acid having from about 4 to 12 carbon atoms.

3. The composition of claim 1 wherein the diarylamine has from about 6 to 30 carbon atoms in each of the aryl groups.

4. The composition of claim 3 wherein at least one of the aryl groups is alkaryl having from 7 to 20 carbon atoms in the alkyl group.

5. The composition of claim 1 wherein the secondary diarylamine is of the formula:

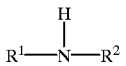

wherein $R^1$ and $R^2$ each independently represent an aryl group having from about 6 to 30 carbon atoms.

6. The composition of claim 1 wherein: the molybdenum carboxylate is that of an aliphatic acid having from about 4 to 18 carbon atoms or an alicyclic acid having from 4 to 12 carbon atoms; each of the aryl groups of the amine is a member selected from the group consisting of phenyl, naphthyl, alkphenyl wherein the alkyl portion has from about 4 to 18 carbon atoms and alknaphthyl wherein the alkyl portion has about 4 to 18 carbon atoms; the quantity of molybdenum is from about 100 to 250 parts per million; and the quantity of amine is from about 1,000 to 4,000 parts per million.

7. A method for improving the antioxidancy and friction properties of a lubricant which comprises including in the lubricant, a molybdenum compound which provides about 100 to 450 part per million of molybdenum said molybdenum compound selected from the group consisting of a sulfur and phosphorus free organic amide molybdenum complex and a molybdenum carboxylate wherein the carboxylate anion has from about 4 to 30 carbon atoms and about 750 to 5,000 parts per million of an oil soluble secondary diarylamine.

8. The method of claim 7, wherein the amine is of the formula

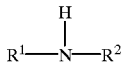

wherein each of $R^1$ and $R^2$ is alkylphenyl having from about 4 to 18 carbon atoms in each alkyl group.

9. The method of claim 8 wherein the molybdenum carboxylate is prepared from an acid having from 4 to 18 carbon atoms and the quantity of molybdenum from the molybdenum carboxylate is from about 100 to 250 parts per million and the quantity of the amine is from about 1,200 to 3,000 parts per million.

10. The method of claim 9 wherein the acid is a monocarboxylic saturated fatty acid.

11. The method of claim 8 wherein the molybdenum carboxylate is molybdenum 2-ethylhexanonate.

12. The method of claim 7 wherein the molybdenum compound is a sulfur and phosphorus free organic amide molybdenum complex.

13. A lubricating oil concentrate prepared by dissolving a total of from about 2.5 to 90 parts by weight of an oil soluble molybdenum compound selected from the group consisting of a sulfur and phosphorus free organic amide molybdenum complex and a molybdenum carboxylate derived from an organic carboxylic acid having about 4 to 30 carbon atoms and an oil soluble secondary diarylamine dissolved in 10 to 97.5 parts of a solvent wherein the weight ratio of molybdenum to amine is from about 0.02 to 0.06 parts of molybdenum for each part of amine.

14. The concentrate of claim 13 wherein the solvent is a mineral oil or synthetic oil and the ratio of molybdenum to amine is from about 0.04 to 0.4 parts of the molybdenum for each part of the amine, the molybdenum carboxylate is that of a monocarboxylic aliphatic acid having from about 4 to 18 carbon atoms or an alicyclic acid having from 4 to 12 carbon atoms, and at least one of the aryl groups of the amine is alkaryl having from 7 to 20 carbon atoms in the alkyl group.

15. The concentrate of claim 13 wherein one or more of the following additives are further present: a dispersant; a detergent; and a zinc dihydrocarbyl dithiophosphate.

16. A lubricating oil composition prepared by mixing an oil soluble molybdenum compound selected from the group consisting of a sulfur and phosphorus free organic amide molybdenum complex and a molybdenum carboxylate derived from monocarboxylic acids selected from the group consisting of aliphatic acids having about 4 to 18 carbon atoms, alicyclic acids containing from 4 to 12 carbon atoms and aromatic acids containing from 7 to 14 carbon atoms and an oil soluble secondary diaryl amine in a lubricating oil wherein the concentration of the molybdenum in the oil is from about 100 to 450 parts per million and the concentration of the amine in the oil is from about 750 to 5,000 parts per million based n said composition.

17. The lubrication composition of claim 16 wherein:

A. the molybdenum compound is a molybdenum carboxylate of an aliphatic acid having from 4 to 18 carbon atoms and the concentration thereof is from about 100 to 250 parts per million of the composition; and B. the diaryl amine is of the formula:

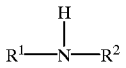

wherein $R^1$ and $R^2$ each independently represent an aryl group having from about 6 to 30 carbon atoms and the concentration thereof is from about 1,000 to 4,000 parts per million of the composition.

18. The lubrication composition of claim 17 wherein the molybdenum carboxylate is that of a fatty acid having from about 4 to 18 carbon atoms and each of $R^1$ and $R^2$ of the amine is a member selected from the group consisting of phenyl, naphthyl, alkphenyl having from about 4 to 18 carbon atoms in the alkyl group and alknaphthyl having from about 4 to 18 carbon atoms in the alkyl group.

19. A method for improving the antioxidant and friction properties of a lubricant which comprises adding to the lubricant an oil soluble molybdenum carboxylate derived from an organic carboxylic acid having from about 4 to 30 carbon atoms and wherein said molybdenum carboxylate provides about 100 to 450 parts per million of molybdenum and about 750 to 5,000 parts per million of an oil soluble secondary diarylamine.

20. The method of claim 19 wherein the carboxylate is derived from a carboxylic acid selected from the group consisting of: butyric acid; valeric acid; caproic acid heptanoic acid; cyclohexanecarboxylic acid; cyclodecanoic acid; naphthenic acid; phenyl acetic acid; 2-methylhexanoic acid; 2-ethylhexanoic acid; suberic acid; octanoic acid; nonanoic acid; decanoic acid; undecanoic acid; lauric acid, tridecanoic acid; myristic acid; pentadecanoic acid; palmitic acid; linolenic acid; heptadecanoic acid; stearic acid; oleic acid; nonadecanoic acid; eicosanoic acid; heneicosanoic acid; docosanoic acid; and eurcic acid.

21. The method of claim 20 wherein: the molybdenum carboxylate provides about 100 to 250 parts per million of molybdenum; about 1,000 to 4,000 parts per million of the oil soluble secondary diarylamine are added to the lubricant and said amine is of the formula

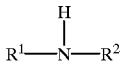

wherein each of $R^1$ and $R^2$ is alkphenyl having from about 4 to 18 carbon atoms in each alkyl group.

*22. A method for lubricating an automotive or truck crankcase or transmission comprising adding the lubricating composition according to claim 1 to said crankcase or transmission.*

* * * * *

UNITED STATES PATENT AND TRADEMARK OFFICE

CERTIFICATE OF CORRECTION

PATENT NO. : RE. 37,363 E
DATED : September 11, 2001
INVENTOR(S) : Vincent James Gatto et al.

It is certified that error appears in the above-identified patent and that said Letters Patent is hereby corrected as shown below:

Column 1,
Line 4, insert the following:

-- More than one reissue application has been filed for the reissue of patent 5,650,381. The reissue applications are 09/359770, filed 7/22/99, now U.S. Pat. RE 37363 and reissue application 09/604285 filed 6/26/00. --

Signed and Sealed this

Fourteenth Day of December, 2004

JON W. DUDAS
*Director of the United States Patent and Trademark Office*